United States Patent [19]
Brockman et al.

[11] 3,794,346
[45] Feb. 26, 1974

[54] OCCUPANT RESTRAINT SYSTEM

[75] Inventors: Henry J. Brockman, Warren;
Lawrence A. Gloomis, Utica, both of Mich.

[73] Assignee: General Motors Corporation, Detroit, Mich.

[22] Filed: May 5, 1972

[21] Appl. No.: 250,673

[52] U.S. Cl. ............ 280/150 AB, 40/77.8, 248/309, 285/189
[51] Int. Cl. ............................................. B60r 21/08
[58] Field of Search............280/150 AB; 248/309; 285/189; 40/77.8

[56] References Cited
UNITED STATES PATENTS

| | | | |
|---|---|---|---|
| 3,625,543 | 12/1971 | Wolff | 280/150 AB |
| 2,731,229 | 1/1956 | Seitz | 248/309 |
| 1,279,935 | 9/1918 | Sweat | 285/189 |
| 1,898,924 | 2/1933 | Willens | 40/77.8 |
| 602,332 | 4/1898 | Jones | 285/189 X |

*Primary Examiner*—David Schonberg
*Assistant Examiner*—John P. Silverstrim
*Attorney, Agent, or Firm*—Herbert Furman

[57] ABSTRACT

An occupant restraint system includes a gas generator and a reaction plate assembly located in generally parallel relationship. The reaction plate assembly includes an elongated U-shaped member having spaced end plates, one being provided with a U-shaped flanged slot or opening. An elongated diffuser between the end plates with one open end thereof terminating within the flanged opening of the one end plate. The other closed end of the diffuser is bolted to the other end plate. The open end of the diffuser includes a generally T-shaped radially extending tab having the shank thereof received within a slot of the flange of the opening to rotatably index the diffuser with respect to the reaction plate assembly. A manifold connects to the outlet end of the gas generator and includes a tapered neck received within the open end of the diffuser. The manifold is bolted to the one end plate.

3 Claims, 4 Drawing Figures

OCCUPANT RESTRAINT SYSTEM

This invention relates generally to an occupant restraint system and more particularly to an improved diffuser assembly for such a system.

Conventional occupant restraint systems include a gas generator or other source of pressure fluid which is located generally parallel to a diffuser and connected thereto by a manifold for providing the pressure fluid to the diffuser and thence to an inflatable occupant restraint cushion to inflate the cushion. Normally the cushion is received about the diffuser for inflation through suitable slots or other apertures in the diffuser. The reaction plate assembly conventionally may include an elongated back plate and a pair of end plates between which the diffuser extends and is secured thereto.

In the assembly of this invention, one of the end plates is provided with a generally U-shape laterally flanged slot or opening. The generally cylindrical diffuser extends between the end plates. The one open end of the diffuser is received within the opening of the one end plate and is provided with a generally T-shape radially extending flange or tab having the shank thereof received within a slot of the flange of the opening to rotatably index the diffuser with respect to the reaction plate assembly and thereby in turn index the apertures of the diffuser with respect to the inflatable cushion. The diffuser, adjacent the other end thereof, is provided with a plurality of lanced radially inwardly offset dimples which seat a flanged closure. The other end of the diffuser is curled over the closure flange to thereby hold the closure against the dimples and close the other end of the diffuser. A bolt extending from the closure is secured to the other end plate to thereby mount the other end of the diffuser to the reaction plate assembly and retain the tab within the slot. A manifold communicating with the outlet end of a gas generator is bolted to the one end plate and has a slightly tapered end extending into the open end of the diffuser to thereby locate the open end of the diffuser within the flanged opening and communicate such end of the diffuser with the gas generator. The diffuser is conventionally received within an inflatable occupant restraint cushion to inflate the cushion.

One of the features of this invention is that it provides an improved diffuser assembly for an occupant restraint system wherein the diffuser extends between the end plates of a reaction plate assembly and is nonrotatably secured to one of the end plates to index the diffuser with respect to the reaction plate assembly and to an inflatable occupant restraint cushion which is inflated from the diffuser. Another feature of this invention is that the one end plate includes a flanged opening and the open end of the diffuser is nonrotatably secured within the opening by a tab of the diffuser being received within a slot in the flange of the opening, the tab and slot being releasable upon slightly axial movement of the diffuser with respect to the reaction plate assembly. A further feature of this invention is that the end plate opening is generally of U-shape and a manifold, communicating the diffuser with a source of pressure fluid, has an outlet received within the open end of the diffuser to locate the diffuser laterally within the opening. Yet another feature of this invention is that the other closed end of the diffuser is secured to the other end plate to locate the diffuser axially or longitudinally of the opening.

These and other features of the invention will be readily apparent from the following specification and drawings wherein.

Figure 1:
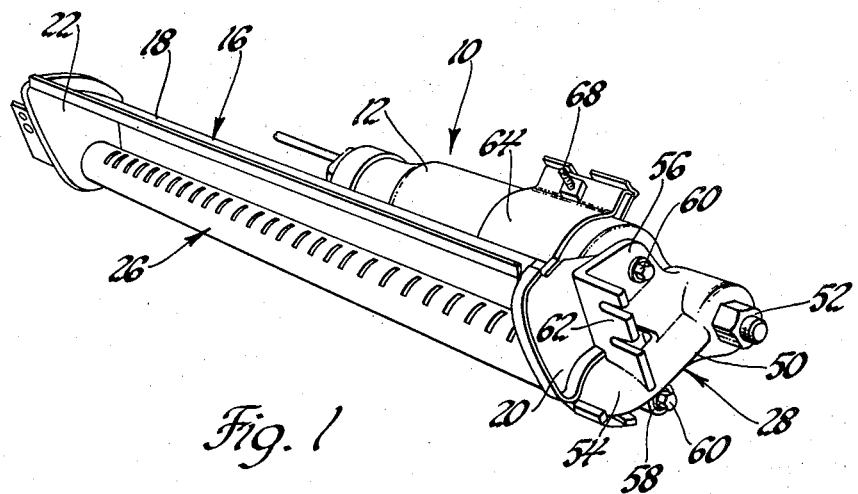
FIG. 1 is a perspective view of an occupant restraint system including a diffuser assembly according to this invention.
Figure 3:
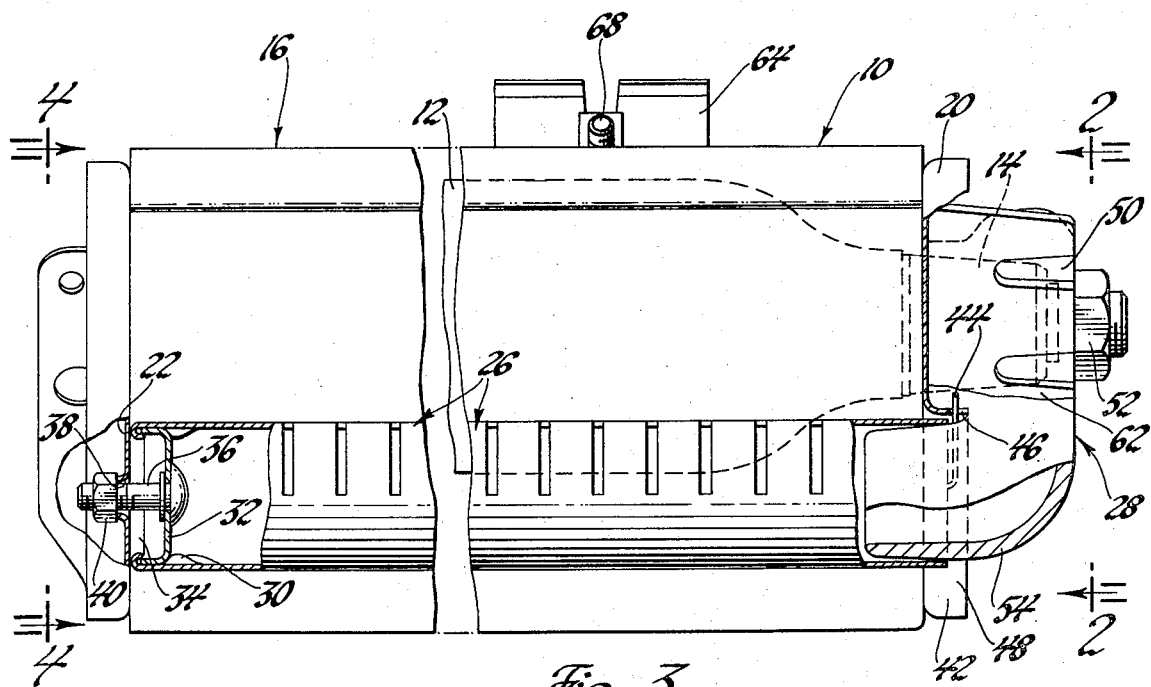
FIG. 3 is an enlarged partially broken away elevational view of a portion of FIG. 1.
Figure 4:
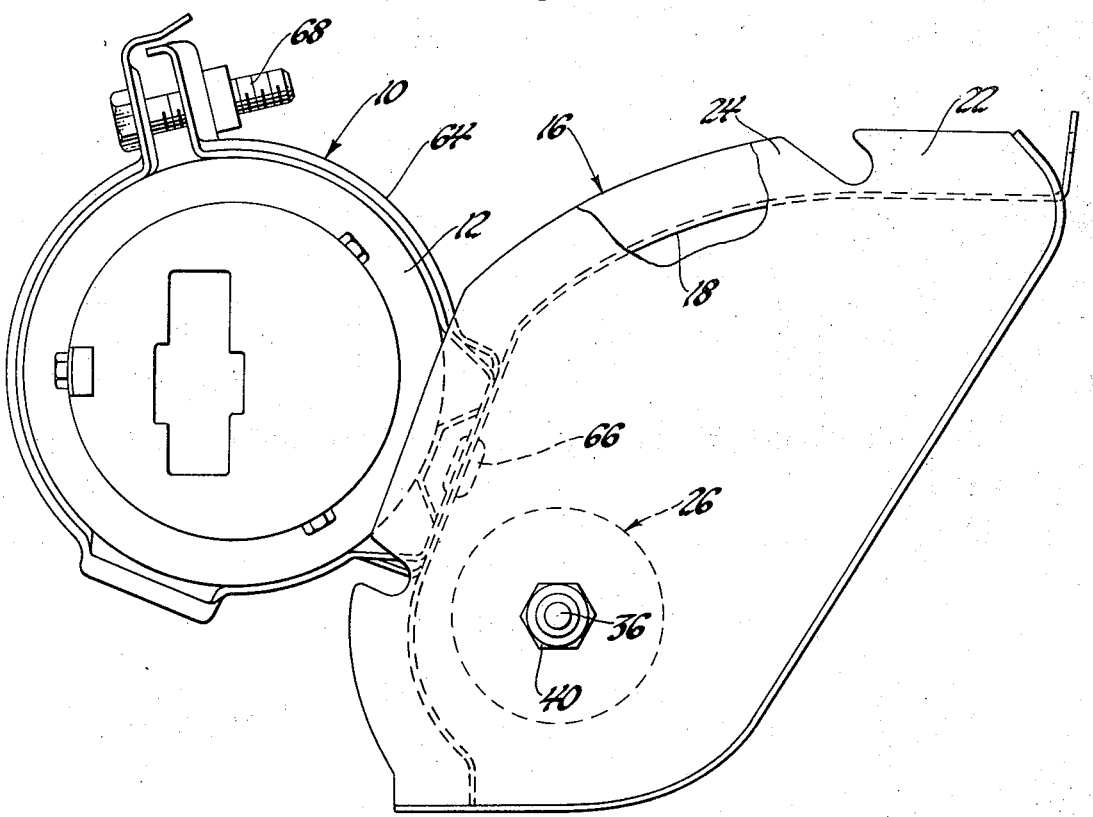
FIG. 4 is an enlarged elevational view taken generally along line 4—4 of FIG. 3.

Referring now particularly to FIG. 1 of the drawings, an occupant restraint system designated generally 10 includes a conventional gas generator 12 having an outlet end 14, FIG. 3. The outlet end 14 releases pressure fluid from the generator to an inflatable occupant restraint cushion upon command of a suitable sensor mounted on the vehicle and sensing vehicle contact with an obstacle. The gas generator 12 forms no part of this invention and other sources of pressure fluid, such as pressure vessels containing fluid under pressure, may likewise be used.

A reaction plate assembly designated generally 16 is located in generally parallel relationship to the gas generator 12. The reaction plate assembly includes back plate 18 of generally U-shaped cross section and right-hand and left-hand end plates 20 and 22 respectively, each of which overlies a respective flanged end of the back plate 16 and is welded or otherwise secured to the end flanges 24 thereof, FIGS. 2 and 3. A suitably slotted or apertured diffuser 26 extends between the end plates and is communicated with the outlet end 14 of the gas generator by a manifold 28. An inflatable occupant restraint cushion, not shown for purposes of clarity, surrounds the diffuser 26 and receives pressure fluid therefrom for inflating the cushion and projecting the cushion from the reaction plate assembly 16 for use by a vehicle occupant.

Figure 2:
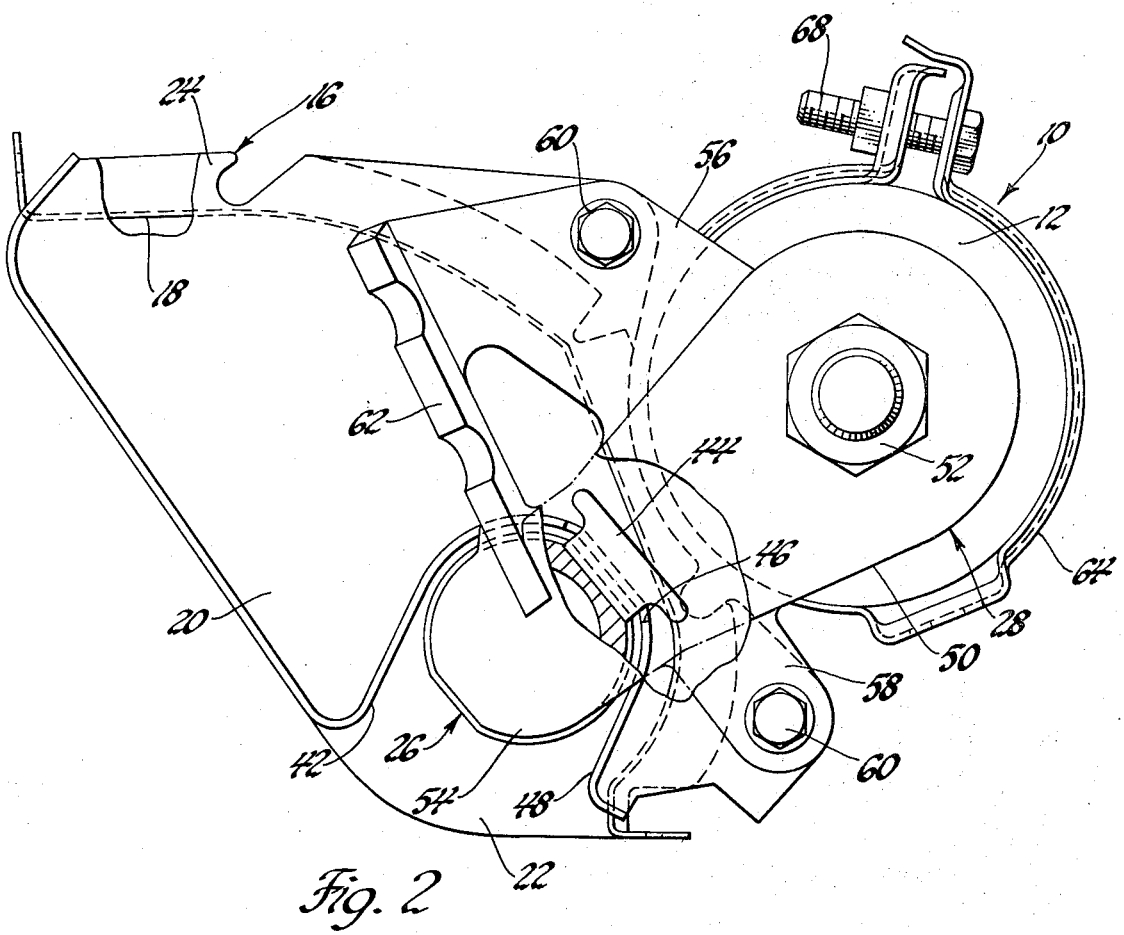
FIG. 2 is an enlarged partially broken away elevational view taken generally along line 2—2 of FIG. 3.

As best shown in FIGS. 2 and 3, the diffuser 26 is generally of circular cross section. Adjacent the left hand end thereof, four integral inwardly deflected dimples 30 are formed by first lancing the diffuser and then deforming the material adjacent the lance inwardly. The dimples 30 seat against a generally cup-shaped or flanged closure 32 to axially locate the closure within the diffuser. The left-hand end edge portion 34 of the diffuser is then curled inwardly over the peripheral flange of the closure to secure the closure in place and close the left-hand end of the diffuser. A bolt 36 is fixed to the closure 32 and extends through a flanged opening 38 in the end plate 22. A nut 40 secures the bolt to the end plate 22. This end of the diffuser is thus rotatably secured or mounted to the reaction plate assembly.

The right-hand open end of the diffuser is rotatably received within a flanged generally U-shaped slot or opening 42 in the end plate 20. It is important that the slots or apertures of the diffuser be properly located or indexed with respect to the surrounding cushion and reaction plate assembly so that the cushion deploys along the proper path when it is inflated from the diffuser. In order to properly locate or index the diffuser 26, a generally T-shaped integral lateral tab 44 extends from the right-hand edge portion of the diffuser and the shank thereof is received within a slot 46 of the flange 48 of opening 42 to thereby nonrotatably index the diffuser and the reaction plate assembly. The tab 44 and slot 46 are, of course, axially movable relative to each other in order to connect and disconnect the resultant indexing means. They, of course, will be interfitted before the left-hand end of the diffuser is secured to the left-hand end plate 22.

The manifold 28 is generally L-shaped and the longer leg 50 thereof has an enlarged end which receives the outlet end 14 of the gas generator 12 and is secured at 52 to a bolt thereof. The shorter leg 54 of the manifold is slightly tapered as shown in FIG. 3 and is received within the open end of the diffuser 26 to thereby communicate the gas generator with the diffuser and locate this end of the diffuser within the flanged opening 42 and locate tab 44 with respect to slot 46. The manifold further includes a pair of integral offset flanges 56 and 58 which seat against the end plate 20 and are bolted thereto at 60 to secure the manifold to the reaction plate assembly. Flange 56 includes a further slotted extension 62 which provides for mounting of the system 10 on the vehicle.

A generally U-shaped bracket 64 is riveted at 66, FIG. 3, to the back plate 18 and surrounds the gas generator 12. Bracket 64 is bolted to itself at 68 to thereby secure the gas generator to the reaction plate assembly.

Thus this invention provides an improved diffuser assembly for an occupant restraint system.

What is claimed is:

1. An occupant restraint system comprising, in combination, an elongated housing adapted to be fixedly mounted on an automotive vehicle and including a pair of spaced end plates, one having a flanged opening therein, an apertured diffuser extending between the end plates and within the flanged opening of the one end plate for inflating an occupant restraint cushion, axially releasable interfitting means on the flange of the opening and the diffuser indexing the apertures of the diffuser with respect to the housing, means securing the diffuser to the other end plate to block axial release of the interfitting means on the diffuser and one end plate flange, and a manifold connecting the diffuser with a source of pressure fluid to radially locate the diffuser within the opening.

2. An occupant restraint system comprising, in combination, an elongated housing adapted to be fixedly mounted on an automotive vehicle and including a pair of spaced end plates, one having a flanged opening therein, an apertured diffuser extending between the end plates and within the flanged opening of the one end plate for inflating an occupant restraint cushion, axially releasable interfitting tab and slot means on the flange of the opening and the diffuser indexing the apertures of the diffuser with respect to the housing, means securing the diffuser to the other end plate to block axial release of the interfitting tab and slot means on the diffuser and one end plate flange, and a manifold for connecting the diffuser with a source of pressure fluid to radially locate the diffuser within the opening.

3. An occupant restraint system comprising, in combination, an elongated housing adapted to be fixedly mounted on an automotive vehicle and including a pair of spaced end plates, one having a laterally flanged opening therein, an apertured diffuser extending between the end plates and having an open end thereof received within the flanged opening of the one end plate, a tab on the open end of the diffuser laterally received within a slot in the flange of the opening to nonrotatably index the apertures of the diffuser with respect to the housing, means securing the diffuser to the other end plate to block lateral movement of the tab out of the slot, and a manifold for connecting the diffuser with a source of pressure fluid and having an outlet end thereof received within the open end of the diffuser to locate the diffuser within the flanged opening.

* * * * *